United States Patent
Strecker et al.

(10) Patent No.: US 9,174,673 B2
(45) Date of Patent: Nov. 3, 2015

(54) METHOD FOR DETERMINING A STEERING RACK FORCE FOR A STEERING DEVICE IN A VEHICLE, STEERING DEVICE AND OPEN-LOOP AND/OR CLOSED-LOOP CONTROL DEVICE FOR A STEERING DEVICE

(75) Inventors: Joerg Strecker, Pluederhausen (DE); Thomas Werner, Rainau (DE)

(73) Assignee: Robert Bosch Automotive Steering GmbH, Gmuend (DE)

( * ) Notice: Subject to any disclaimer, the term of this patent is extended or adjusted under 35 U.S.C. 154(b) by 0 days.

(21) Appl. No.: 14/116,790

(22) PCT Filed: Jul. 16, 2012

(86) PCT No.: PCT/EP2012/063861
§ 371 (c)(1),
(2), (4) Date: Dec. 6, 2013

(87) PCT Pub. No.: WO2013/026624
PCT Pub. Date: Feb. 28, 2013

(65) Prior Publication Data
US 2014/0163822 A1 Jun. 12, 2014

(30) Foreign Application Priority Data
Aug. 22, 2011 (DE) .......................... 10 2011 052 881

(51) Int. Cl.
*B62D 11/00* (2006.01)
*B62D 55/02* (2006.01)
(Continued)

(52) U.S. Cl.
CPC . *B62D 6/04* (2013.01); *B62D 6/008* (2013.01)

(58) Field of Classification Search
CPC .... B62D 5/0463; B62D 15/025; B62D 6/008;
B62D 6/10; B62D 5/0466; B62D 5/0406;
B62D 5/0409; B62D 15/0245; B62D 5/0481;
B62D 5/0487; B62D 5/049; B62D 6/00;
B62D 6/003; B62D 6/04; B62D 9/005;
B62D 5/046
USPC ........ 701/41, 42; 180/9.38, 9.44, 37, 222, 78,
180/401, 402, 410, 428, 240
See application file for complete search history.

(56) References Cited

U.S. PATENT DOCUMENTS 6,108,599 A * 8/2000 Yamamoto et al. ............. 701/41
6,134,490 A * 10/2000 Ito et al. .......................... 701/42

(Continued)

FOREIGN PATENT DOCUMENTS

DE 10 2006 046 666 4/2008
DE 10 2007 026 189 12/2008

(Continued)

*Primary Examiner* — Muhammad Shafi
(74) *Attorney, Agent, or Firm* — Jordan and Hamburg LLP (57) ABSTRACT

A method for determining a steering rack force (FR) for a steering system of a vehicle, in which a first steering rack force (RFD) is ascertained as a function of at least one force that occurs in the steering system or at least one torque (tor_RA) that occurs in the steering system. So as to provide less strong feedback on the force conditions in the steering system for reasons of driving comfort, in particular when this is currently not required, it is proposed to ascertain a second steering rack force (RFC) as a function of at least one vehicle variable (v, ang_RA), which characterizes the state of movement of the vehicle, and to generate a resulting steering rack force (FR) based on the first steering rack force (RFD) and the second steering rack force (RFC).

18 Claims, 5 Drawing Sheets

(51) Int. Cl.
    *B62D 6/04*    (2006.01)
    *B62D 6/00*    (2006.01)

(56) References Cited

U.S. PATENT DOCUMENTS

| | | | |
|---|---|---|---|
| 8,150,582 B2 | 4/2012 | Blommer et al. | |
| 8,352,125 B2 | 1/2013 | Gruener et al. | |
| 2005/0053126 A1* | 3/2005 | Balamurugan et al. | 375/232 |
| 2005/0072622 A1* | 4/2005 | Satake et al. | 180/446 |
| 2009/0078494 A1* | 3/2009 | Dornhege et al. | 180/446 |
| 2010/0268422 A1 | 10/2010 | Blommer et al. | |
| 2012/0046836 A1 | 2/2012 | Strecker et al. | |
| 2012/0083972 A1 | 4/2012 | Gruener et al. | |
| 2012/0217083 A1* | 8/2012 | Brickner | 180/417 |

FOREIGN PATENT DOCUMENTS

| | | |
|---|---|---|
| DE | 10 2008 042 666 | 5/2010 |
| DE | 10 2010 003 242 | 10/2010 |
| DE | 10 2009 002 706 | 11/2010 |
| DE | 10 2010 030 986 | 1/2012 |
| EP | 2 208 659 | 7/2010 |

\* cited by examiner

METHOD FOR DETERMINING A STEERING ROCK FORCE FOR A STEERING DEVICE IN A VEHICLE, STEERING DEVICE AND OPEN-LOOP AND/OR CLOSED-LOOP CONTROL DEVICE FOR A STEERING DEVICE

BACKGROUND OF THE INVENTION

The invention relates to a method for determining a steering rack force for a steering system of a vehicle, in which a first steering rack force is ascertained as a function of at least one force that occurs in the steering system or at least one torque that occurs in the steering system. The invention further relates to an open-loop and/or closed-loop control device for a steering system for a vehicle which is adapted to carry out such a method.

A target steering torque is ascertained in modern steering systems, for example electric power steering (EPS) or steer-by-wire (SbW) steering systems. A steering torque on a steering means of the steering system, for example on a steering wheel, is set to the target steering torque so as to support the force that is applied by the driver when steering the vehicle, or to counteract the force that is applied by the driver. It is known to ascertain the target steering torque as a function of the steering rack force.

A method for determining a force that acts on a steering gear is known from DE 10 2009 002 706 A1. According to this method, a force that acts on the steering gear is ascertained based on the motor torque. This method provides the driver of the vehicle with good feedback on the real force conditions in the steering gear. However, strong feedback is perceived to be disturbing at least in some instances.

It is the object of the invention to provide a method for determining a steering rack force which provides less strong feedback on the force conditions in the steering system for reasons of driving comfort, in particular when such feedback is currently not required.

SUMMARY OF THE INVENTION

In one embodiment, a method for determining a steering rack force for a steering system of a vehicle is provided, in which a first steering rack force is ascertained as a function of at least one force that occurs in the steering system or at least one torque that occurs in the steering system, wherein a second steering rack force is ascertained as a function of at least one vehicle variable that characterizes the state of movement of the vehicle, and a resulting steering rack force is found based on the first steering rack force and the second steering rack force.

Because the first steering rack force is ascertained as a function of a force and/or a torque in the steering system, the driver always receives relatively strong feedback on the force conditions in the steering system, if a steering torque is calculated exclusively as a function of the first force. The second steering rack force depends, at the most, indirectly on the real force conditions in the steering system because it is ascertained as a function of the vehicle variable. The vehicle variable that is used can be any variable that allows at least approximate conclusions to be drawn on the state of movement of the vehicle. For example, the vehicle variable may be a speed of the vehicle, transverse acceleration of the vehicle and/or a steering angle of the vehicle. In one embodiment, the second steering rack force is ascertained as a function of the vehicle speed and the steering angle. In another embodiment, the second steering rack force is ascertained as a function of the transverse acceleration, without having to necessarily consider the vehicle speed or the steering angle.

Because, according to the method, the second steering rack force is considered in addition to the first steering rack force, the intensity of the feedback on the force conditions in the steering system is reduced, while maintaining some dependency of the steering torque on the current driving situation. Many drivers perceive this to be more comfortable, at least in certain situations. By suitably designing the relationship between the first steering rack force and the second steering rack force so as to produce the resulting steering rack force, the degree of feedback can be easily adapted to the requirements of the vehicle manufacturer. A high degree of feedback, as a whole, conveys dynamic feedback on the properties of the roadway, while a relatively low degree of feedback allows a steering torque to be generated, which is largely decoupled from the properties of the roadway.

So as to be able to vary the degree of dynamic feedback while the steering system is being operated, which is to say while driving, it may be provided that the resulting steering rack force is found as a function of a control variable, wherein the influence of the first steering rack force and of the second steering rack force on the resulting steering rack force depends on the control variable. The control variable can be generated by an open-loop and/or closed-loop device of the steering system, or by another open-loop and/or closed-loop device of the vehicle. The variable can depend on a driving mode specified by the driver, for example "sporty" or "standard", and/or can be automatically ascertained as a function of a driving situation.

According to one embodiment, the control variable is a binary variable, and either the first steering rack force or the second steering rack force is used as the resulting steering rack force, depending on the control variable. The binary variable thus allows switching between a resulting steering rack force that is exclusively generated as a function of the first steering rack force, and a resulting steering rack force that is exclusively generated as a function of the second steering rack force.

It is particularly preferred for this purpose that the influence of one steering rack force is continuously decreased, and the influence of the respective other steering rack force is continuously increased, during a state transition of the binary variable. The switching between the first steering rack force and the second steering rack force thus does not take place abruptly, but within a particular transition time. A jump in the resulting steering rack force during switching is thus prevented.

In another embodiment, the control variable is a numerical value, for example, which specifies the influence of the first steering rack force, or of the second steering rack force, on the resulting steering rack force. It may accordingly be provided that the resulting steering rack force is found by weighting the first steering rack force and the second steering rack force as a function of at least one weighting factor, preferably in the form of a convex combination of the first steering rack force with the second steering rack force, wherein the weighting factor is calculated as a function of the control variable. In the case of the convex combination, the weighting factor can correspond to the coefficient of this convex combination, for example.

In a particularly preferred embodiment, the control variable is ascertained as a function of the resulting steering rack force that is found. This means that the influence of the first steering rack force, or of the second steering rack force, on the resulting steering rack force is predetermined as a function of the fed-back resulting steering rack force.

It may be provided for this purpose that an influence of the first steering rack force on the resulting steering rack force is higher for a resulting steering rack force that is higher in absolute terms than for a resulting steering rack force that is lower in absolute terms. Since the steering rack force is generally quite low when driving straight ahead, a comfortable steering sensation is achieved in this way when driving straight ahead, substantially without influence from an uneven surface or other properties of the roadway. When driving in a curve, for example, where the steering rack force is relatively high, the driver receives higher feedback on the properties of the roadway and can therefore respond better if necessary.

It may be provided that the resulting steering rack force is delayed during ascertainment of the control variable, and the control variable is found as a function of the delayed resulting steering rack force. The method can be carried out using discrete-time signal processing means or signal processing methods, for example. In this case, the resulting steering rack force is preferably delayed by a clock cycle of the signal processing means or of the signal processing methods.

The control variable is preferably ascertained as a function of a vehicle speed.

The method can be implemented particularly easily if the control variable is ascertained by way of a characteristic map.

It may be provided for this purpose that a characteristic curve of the characteristic map is predetermined as a function of the vehicle speed and/or is selected from a number of predetermined characteristic curves. The characteristic map thus receives not only the optionally delayed, resulting steering rack force, but also the vehicle speed as input variables. Depending on the design of the characteristic map, the shape of the characteristic curve is varied as a function of the vehicle speed and/or the characteristic curve is selected as a function of the vehicle speed.

So as to avoid fast changes in the resulting steering rack force and/or preclude oscillations due to feedback, it may be provided that the control variable is filtered using a low-pass filter, after the variable has been ascertained by way of the characteristic map.

According to a further embodiment of the invention, a steering system for a vehicle is provided, wherein the steering system is adapted to carry out a method according to the invention.

According to still another embodiment, an open-loop and/or closed-loop control device for a steering system for a vehicle is provided, wherein the open-loop and/or closed-loop control device is adapted, and preferably programmed, to carry out a method according to the invention.

One embodiment consists in a computer program, which is programmed so that the open-loop and/or closed-loop control device carries out the method according to the invention when the program is executed on the control device. The open-loop and/or closed-loop control device may comprise memory means, in particular semiconductor memories, in which such a computer program is stored. It is also possible to provide further memory means that are separate from the open-loop and/or closed-loop control device, such as a data carrier, for example, on which the computer program is stored.

Additional characteristics and advantages of the invention will be apparent from the description provided hereafter, which describes exemplary embodiments of the invention in more detail based on the drawings.

DETAILED DESCRIPTION OF THE PREFERRED EMBODIMENTS

Figure 1:
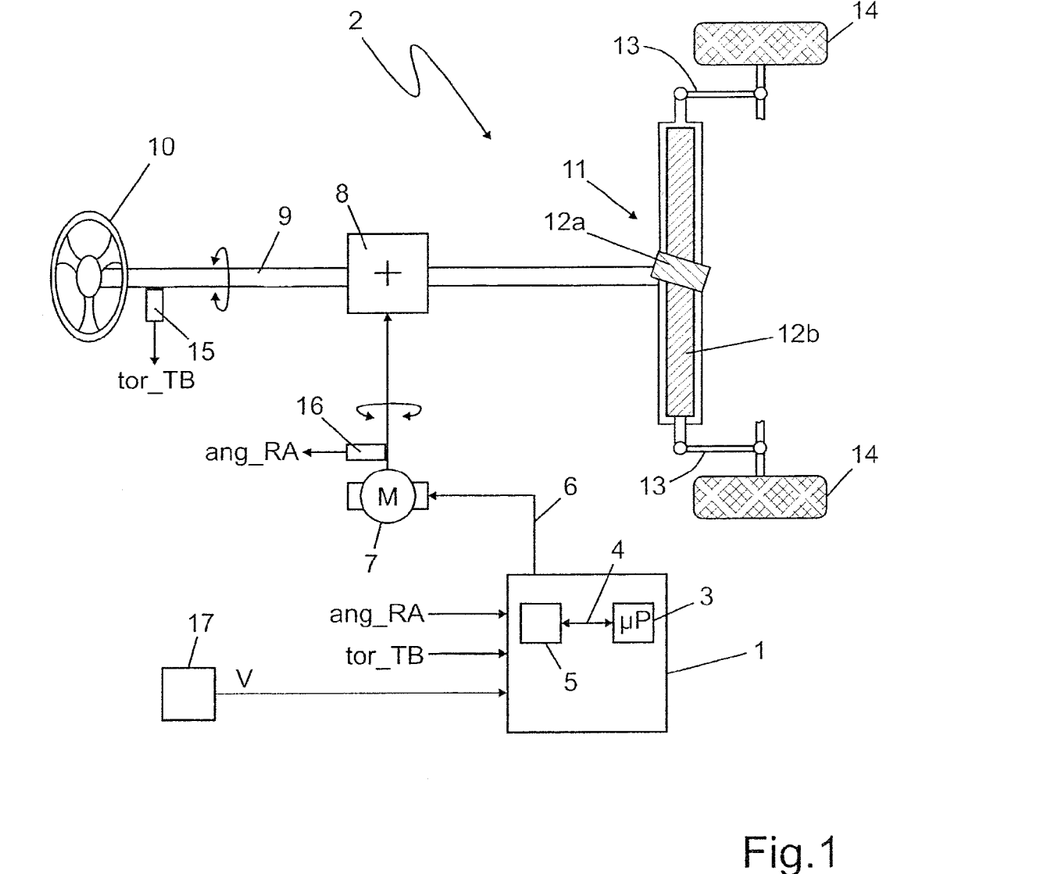
FIG. 1 shows a steering system comprising an open-loop and/or closed-loop control device for carrying out the method according to the invention.

FIG. 1 illustrates an open-loop and/or closed-loop control device, which is referred to as a control unit 1 and is associated with a steering system 2. A computer (for example, a microcomputer or microcontroller) having a processor 3 is disposed in the control unit 1, wherein the processor 3 is connected to a memory element 5 by way of a data line 4, for example a bus system. The control unit 1 is connected to a motor 7 by way of a signal line 6, whereby open-loop and/or closed-loop control of a motor 7 by the control unit 1 is made possible. The motor 7 is designed as an electric motor, for example, and acts on a torsion bar 9 by way of a gearbox 8. A steering means 10, for example a steering wheel, is disposed on the torsion bar 9 and can be used by the driver to apply a torque onto the torsion bar 9 by operating the steering means 10.

The steering system 2 moreover comprises a steering gear 11, which is designed as a rack-and-pinion steering gear, for example. However, the steering gear 11 can also be designed as a recirculating-ball gear or as a ball-and-nut gear. The description hereafter, primarily assumes a rack-and-pinion steering gear, wherein the steering gear comprises a pinion 12a and a steering rack 12b. However, the type of steering is immaterial for the invention. For example, the steering system 2 illustrated in FIG. 1 could be implemented as a ball-and-nut steering system or as an independent wheel steering system, instead of a rack-and-pinion steering system.

The steering gear 11 is connected on each vehicle side to a steering linkage 13 by way of the pinion 12a and the steering rack 12b, each steering linkage cooperating with a wheel 14.

The steering system 2 further comprises a torque sensor 15 for detecting a steering torque that acts on the steering by way of a steering shaft. According to the exemplary embodiment shown in FIG. 1, a torsion bar torque tor_TB is detected for this purpose by way of the torque sensor 15, the torque corresponding to the above-mentioned steering torque. The steering system 2 further comprises an angle sensor 16 for detecting a rotor angle ang_RA of the motor 7. For example, the rotor angle ang_RA can characterize a rotation of the entire torsion bar 9 about the longitudinal axis thereof. The rotor angle ang_RA thus corresponds to a rotational angle of the torsion bar 9, and thus to a steering angle of the wheels 14, because the motor 7 is connected to the torsion bar 9 by way of the gearbox 8, and the torsion bar is connected to the wheels 14 by way of the steering gear 11 and the steering linkage 13. The values detected by way of the sensors 15 and 16 are supplied to the control unit 1.

The steering system shown in FIG. 1 represents one of a plurality of possible embodiments of steering systems that are suitable for carrying out the method according to the invention. In another embodiment, the steering gear is designed as a ball-and-nut gear, for example. According to another exemplary embodiment, the motor 7 may also be disposed so as to act, together with the torsion bar 9, on the pinion 12a disposed in the steering gear 11, or so as to act directly on the steering rack 12b—by way of another pinion.

According to a further embodiment, another variable describing a current position of the steering system 2 is ascertained or used to carry out the method according to the invention, instead of the rotor angle ang_RA. For example, the steering angle can be ascertained by way of an angle sensor, which is disposed on the torsion bar 9. A current position of the steering system 2 could further be detected by way of a sensor, which is disposed on the steering rack 12b. In principle, a plurality of known variables could be determined or used here. However, using the rotor angle ang_RA has the advantage that this angle can be determined with great precision and frequently is already available in modern steering systems.

Moreover, a vehicle, in which the steering system 2 is installed, comprises a speed sensor 17, which can be used to detect a speed v of the vehicle. The control unit 1 has access to the speed v that is determined by way of the speed sensor 17.

Figure 2:
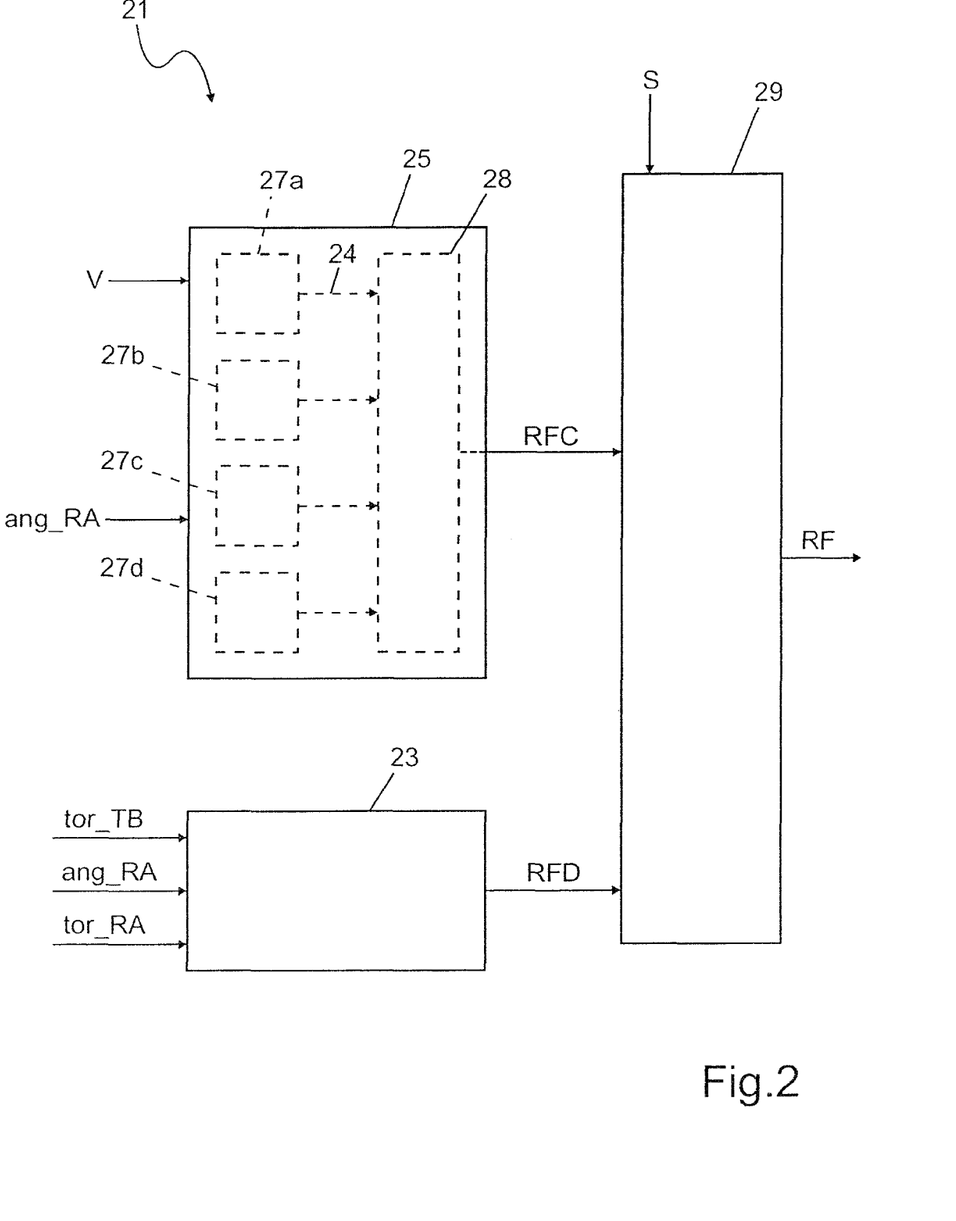
FIG. 2 shows a block diagram of a method for determining a steering rack force for the steering system shown in FIG. 1.

FIG. 2 shows a block diagram of a method 21 for determining a steering rack force RF of the steering system 2. The method 21 includes a functional block 23 for determining a first steering rack force RFD as a function of a force that occurs in the steering system 2, or at least one torque that occurs in the steering system 2. In the exemplary embodiment shown, the functional block 23 calculates the first steering rack force RFD as a function of an ascertained or detected motor torque tor_RA. The motor torque tor_RA can be the torque on a shaft of the motor 7, for example. As an alternative or in addition, a further torque that occurs inside the steering system, or a force (for example the torsion bar torque tor_TB), which occurs inside the steering system 2, can be provided as an input variable for the functional block 23, which the functional block 23 uses to calculate the first steering rack force RFD.

Moreover, the functional block 23 also calculates the first steering rack force RFD as a function of the steering angle ang_RA. Because the first steering rack force RFD is dependent in particular on the motor torque tor_RA that occurs in the steering system 2, the first steering rack force RFD reflects real force conditions that occur on a steered axle of the vehicle, and can thus be used to generate dynamic feedback to the driver on current properties of the roadway on which the vehicle is traveling. In particular a target steering torque, which includes the dynamic feedback on the properties of the roadway in the time curve thereof, can be calculated as a function of the first steering rack force RFD. The first steering rack force is therefore also referred to as "rack force dynamic".

Another functional block 25 of the method ascertains a second steering rack force RFC as a function of at least one vehicle variable, which characterizes the state of movement of the vehicle. In the embodiment shown, the vehicle speed v and the steering angle ang_RA are provided as such vehicle variables, for example. The functional block 25 thus calculates the second steering rack force RFC exclusively as a function of such vehicle variables that do not directly reflect the force conditions in the steering system 2. The second steering rack force RFC calculated by the functional block 25 consequently remains substantially without influence from real force conditions in the steering system 2, and more particularly from real axle load conditions. The second steering rack force RFC thus reflects current properties of the roadway, such as an uneven surface. As a result, the second steering rack force RFC makes it possible to generate a steering sensation that is at least largely decoupled from influences of the roadway, which allows comfortable use of the steering system 2, wherein the driver, however, must do without feedback on the roadway properties. A target steering torque can thus be calculated as a function of the second steering rack force RFC, which allows a comfortable steering sensation that is at least largely decoupled from influences of the roadway. The second steering rack force is therefore also referred to as "rack force comfort".

The functional block 25 for calculating the second steering rack force RFC as a function of the vehicle variables, without direct consideration of the forces or torques that occur in the steering system 2 or that act directly on the steering system 2, can thus take on any arbitrary form. For example, several models 27a to 27d may be provided, which calculate a value of the second steering rack force RFC for different driving situations. For example, a first model 27a can calculate the second steering rack force RFC for a normal driving mode, a second model 27b can calculate the second steering rack force RFC during parking, a third model 27c can take hysteresis properties with respect to an axle of the vehicle into consideration, and a model 27d can describe an influence on the second steering rack force RFC, which results from a raising of the vehicle as a function of the steering angle. A functional block 28 ascertains the second steering rack force RFC as a function of variables that are calculated by the individual models 27a to 27d. Such a method for calculating the second steering rack force RFC is described in patent application DE 10 2010 030 986, the entire content of which is hereby incorporated by reference.

A functional block 29 of the method 21 calculates a resulting steering rack force RF as a function of the first steering rack force RFD and the second steering rack force RFC. The resulting steering rack force RF is thus found as a combination of the two steering rack forces RFD and RFC. The functional block 29 can be easily adapted as a function of the desired properties of the steering system 2. For example, if a steering sensation with relatively strong feedback on roadway properties is desired, the block 29 may be adapted so that the influence of the first steering rack force RFD on the resulting steering rack force RF is relatively high, as compared to the influence of the second steering rack force RFC.

Conversely, for the case where a comfortable steering sensation that is largely independent of the roadway properties is desired, the block 29 may be adapted so that the influence of the first steering rack force RFD on the resulting steering rack force RF is relatively low, as compared to the influence of the second steering rack force RFC on the resulting steering rack force RF.

The influence of one of the two steering rack forces RFD, RFC on the resulting steering rack force RF compared to the respective other steering rack force RFC, RFD can also be established during operation of the steering system 2, which is to say while driving, for example as a function of a driving mode selected by the driver, or as a function of an automatically ascertained driving situation. A control variable s, which the functional block 29 takes into consideration when calculating the resulting steering rack force RF, can be provided so as to establish the influence of the individual steering rack forces RFD, RFC on the resulting steering rack force RF.

Figure 3:
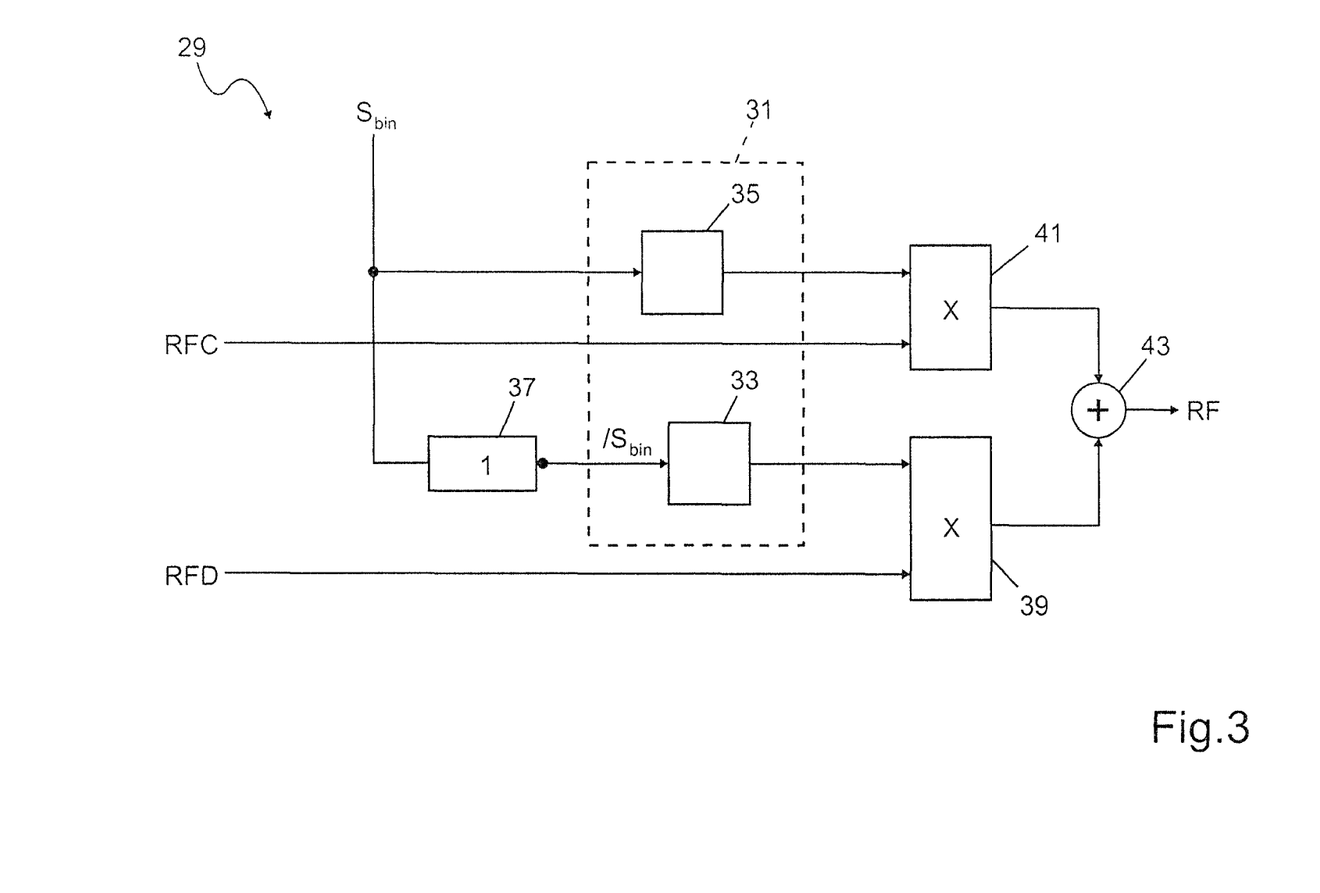
FIG. 3 shows a detail of FIG. 2 according to a first embodiment of the invention.

FIG. 3 shows a possible implementation of the functional block 29. The control variable s here is a binary variable $s_{bin}$. The block 29 selects either the first steering rack force RFD, or the second steering rack force RFC, as the resulting steering rack force RF as a function of the logic state of the binary variable $s_{bin}$. So as to prevent a jump in the time curve of the resulting steering rack force RF when switching between the two steering rack forces RFD, RFC, means 31 are provided, which are adapted to continuously reduce the influence of one steering rack force RFD, RFC, while increasing the influence of the respective other steering rack force RFC, RFD, after the logic state of the binary signal $s_{bin}$ has changed. This continuous switching preferably takes place during a transition period following the state transition of the binary variable sun.

The means 31 comprise a first limiting element 33 for limiting an edge steepness of the binary signal. An input of the first limiting element 33 is connected to an output of an inverter 37, wherein the inverter 37 is adapted to invert the binary signal sun. The means 31 additionally comprise a second limiting element 35 for limiting the edge steepness. An input of the second limiting element 35 is connected to the binary variable $s_{bin}$. The limiting elements 33, 35 for limiting the edge steepness can be so-called "rate limiters" or low-pass filters or the like.

The first steering rack force RFD is present at a first multiplier 39. Moreover, an output of the first limiting element 33 is connected to the first multiplier 39, so that the first multiplier 39 can multiply the inverted binary signal/$s_{bin}$ integrated by the first limiting element 33 with the first steering rack force RFD. A second multiplier 41 is provided in corresponding fashion, at which the second steering rack force RFC and the binary signal $s_{bin}$ integrated by way of the second limiting element 35 are present. The outputs of the two multipliers 39, 41 are connected to an adder 43, which calculates the resulting steering rack force RF as a sum of the results of the multiplications carried out by the two multipliers 39, 41.

The variant of the functional block 29 shown in FIG. 3 thus allows switching between the two steering rack forces RFD, RFC, wherein the means 31, and more particularly the two limiting elements 33, 35, cause a smooth transition when switching between the forces RFD, RFC. If the binary variable $s_{bin}$ has the logical value 0, the first steering rack force RFD is selected, whereby the generation of a target steering torque is made possible, which includes strong feedback on the properties of the road. If the binary variable $s_{bin}$ has the value 1, the second steering rack force RFC is selected, which makes it possible to generate a target steering torque without feedback on the roadway properties.

Figure 4:
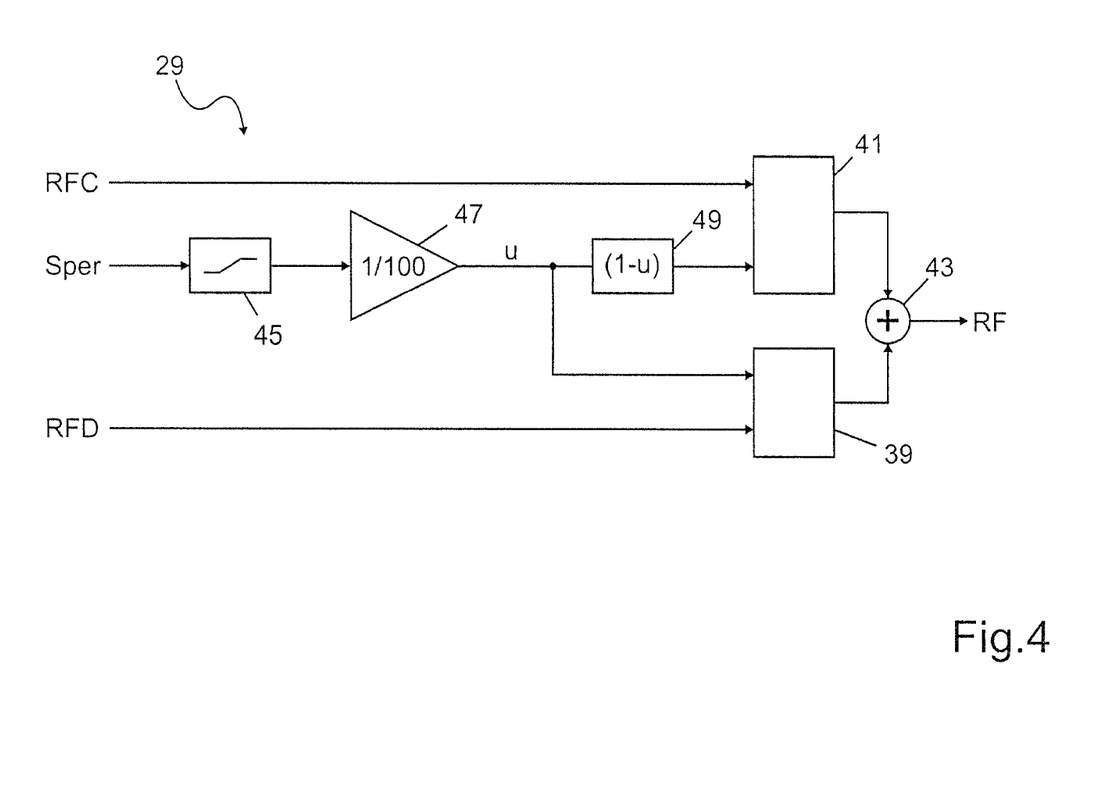
FIG. 4 shows a detail of FIG. 2 according to a second embodiment of the invention.

FIG. 4 shows a possible implementation of the functional block 29, in which the control variable s provided for is a mixing ratio $s_{per}$ of the two steering rack forces RFD, RFC. In the illustrated embodiment, the mixing ratio $s_{per}$ is a percentage, wherein a value of 100% corresponds to a selection of only the first steering rack force RFD as the resulting steering rack force, and a value of 0% corresponds to the selection of only the second steering rack force RFC as the resulting steering rack force RF. Intermediate values for the percentage $s_{per}$ indicate a corresponding mixture of the two forces RFD, RFC, wherein the resulting steering rack force is preferably found as a convex combination in accordance with the equation $$RF = u \cdot RFD + (1-u) \cdot RFC.$$

The variable u is a weighting factor, which is found as a function of the percentage $s_{per}$, as is described below.

As is apparent from FIG. 4, the control variable $s_{per}$ is limited by way of an optional limiter 45 to a value range between 0 and 100, inclusive. A scaling element 47 divides the variable $s_{per}$, which was optionally limited by way of the limiter 45, by 100, and outputs a scaled signal as the weighting factor u. The first multiplier 39 receives the first steering rack force RFC and the signal u, which was scaled by way of the scaling element 47, as input variables. The scaled signal u is additionally sent to an arithmetic element 49, which subtracts the signal output by the scaling element 47 from the value 1. Input variables of the second multiplier 41 are an output variable of the arithmetic element 49 and the second steering rack force RFD. The resulting steering rack force RF is found by adding the output values of the two multipliers 39, 41 with each other, in the manner shown in the embodiment in FIG. 3.

By way of the embodiment shown in FIG. 4, the mixing ratio $s_p$, between the two steering rack forces RFC, RFD can thus be freely adjusted. To this end, it may be provided that the variable $s_{per}$ is predetermined by the control unit 1, or externally, which is to say by another control unit of the vehicle. For example, the variable $s_{per}$ can be predetermined as a function of a driving mode, a driving state or other variables.

Figure 5:
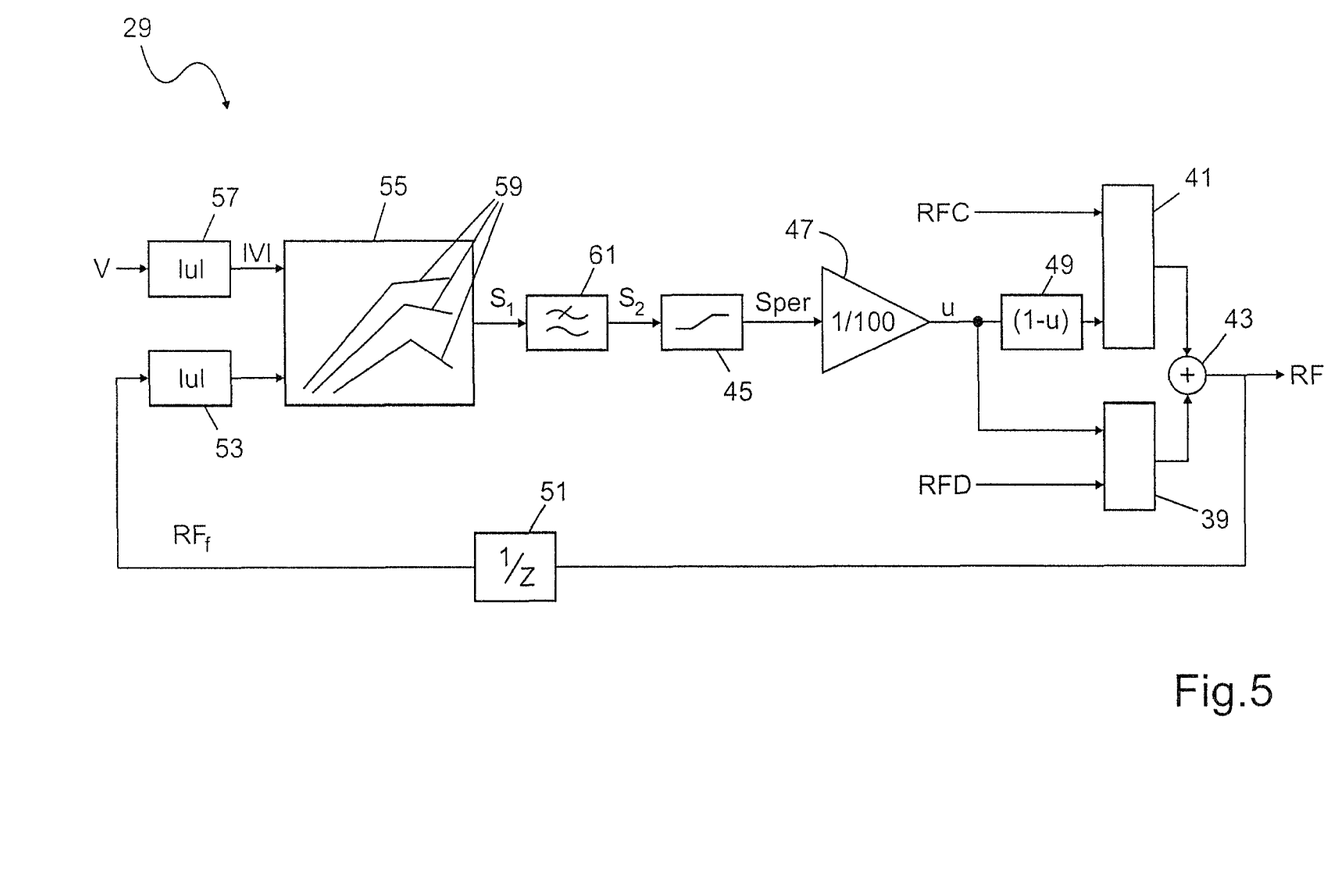
FIG. 5 shows a detail of FIG. 2 according to a third embodiment of the invention.

In the embodiment shown in FIG. 5, the variable $s_{per}$ is not predetermined externally, but ascertained directly by the method 21. The functional blocks or elements for calculating the resulting steering rack force RF as a function of the variable $s_{per}$ correspond to the elements or functional blocks shown in FIG. 4, and will therefore not be described again.

As is apparent from FIG. 5, the variable $s_{per}$ is found as a function of the resulting steering rack force RF that is fed back via a delay element 51. In the embodiment shown, the method is carried out by a discrete-time signal processing system, and a delay of the delay element 51 corresponds to a clock time of the signal processing system.

The resulting steering rack force $RF_f$ delayed by way of the delay element 51 is supplied to a first absolute-value generator 53, the output of which is connected to an input of a characteristic map 55. The characteristic map 55 is adapted to ascertain a characteristic map variable $s_1$ as a function of the absolute value of the delayed resulting steering rack force $RF_f$. It may be provided that the characteristic map 45 additionally ascertains the characteristic map variable s, as a function of the absolute value of the vehicle speed v. A second absolute-value generator 57 may be provided for this purpose, wherein the vehicle speed v is present at an input of the second absolute-value generator 57, and an output of the second absolute-value generator 57 is present at a further input of the characteristic map 55. For example, the characteristic map 55 may be adapted to select a characteristic curve 59 as a function of the absolute value of the speed v (which is to say, as a function of a value output by the second absolute-value generator 57). It may also be provided that the shape of a particular characteristic curve 59 is varied as a function of the absolute value of the speed |v|. The selection of the characteristic curve and variation of the shape of the characteristic curve can also be combined. In one embodiment, which is not shown, a dependency of the variable $S_1$ on the absolute value of the speed |v| is not provided for, which is to say, the second absolute-value generator 57 is not present in this embodiment, and the absolute value of the speed |v| is not input into the characteristic map 55.

A low-pass filter 61 is disposed between the output of the characteristic map 55 and the input of the limiter 45, the filter filtering the characteristic map signal s, and forwarding a filtered characteristic map signal $s_2$ to the limiter 45.

For example, the characteristic curve 59, or the characteristic curves 59, of the characteristic map 55 can be selected so that a relatively small value of the variable $s_{per}$ is ascertained for a relative small value, in absolute terms, of the resulting steering rack force RF, so that, in this case, the influence of the second steering rack force RFC on the resulting steering rack force RF is relatively large as compared to the first steering rack force RFD. The consequence of this is that the steering sensation, when driving straight ahead, where the resulting steering rack force RF is relatively small, is at least substantially without influence from the properties of the roadway, and the steering system 2 thus conveys a comfortable, disturbance-free center point feeling.

When driving in a curve or when the steering system 2 is subject to high load, for example, high values of the resulting steering rack force RF are obtained, in absolute terms. It may be provided that the characteristic curve 59 is, or the characteristic curves 59 are, selected so that a relatively high value of the variable $s_{per}$ is obtained, in absolute terms, so that the influence of the first steering rack force RFD on the resulting steering rack force RF is high compared to the influence of the second steering rack force RFC, whereby a dynamic steering sensation can be generated, which conveys information to the driver about roadway contact and the condition of the roadway.

If dependence of the variable $s_1$ on the speed v is provided for, the overlap between the forces RFD, RFC, which is to say the raising or lowering of the value of the variable $s_{per}$ can be variably predetermined as a function of the vehicle speed v. Moreover, the feedback by way of the signal $RF_f$ allows a smooth overlap between the forces RFD and RFC, even if the two forces RFD, RFC are considerably different from each other. In this way, jumps in the resulting steering rack force RF are prevented, so that inadvertent torque peaks or jumps in the target steering torque ascertained based on the resulting steering rack force RF, or in the steering sensation resulting therefrom, are avoided.

Altogether, the invention makes it possible to provide a steering system 2, which not only provides the driver with good feedback on properties of the roadway and of the vehicle, but also conveys a comfortable driving sensation in different driving situations, for example when driving straight ahead. Because two steering rack forces are combined by way of the functional block 29, the behavior of the method 21 or of the steering system 2 can easily be adapted to specifications, such as those of a vehicle manufacturer, by a relatively simple modification of the functional block 29.

The invention claimed is:

1. A method for controlling power steering of a vehicle during a steering operation of a steering system of the vehicle, the steering system including an electric motor and a control unit, the control unit including a processor, the method comprising:
    determining by the processor a dynamic steering rack force of a steering rack of the vehicle, based on either one of a force or torque that occurs within the steering system;
    determining by the processor a comfort steering rack force of a steering rack of the vehicle, based on a variable indicative of a state of movement of the vehicle;
    deriving by the processor a resulting rack force as a relationship between the dynamic rack force and the comfort rack force;
    determining by the processor a target steering torque based on the resultant rack force; and
    sending a first signal from the control unit to an electric motor for enacting the target steering torque upon the steering system so as to control said power steering of the vehicle.

2. The method according to claim 1, wherein said relationship between the dynamic rack force and the comfort rack force is determined as a function of a control variable.

3. The method according to claim 2, wherein the control variable is a binary variable which selects one of the dynamic steering rack force and the comfort steering rack force, and wherein a state change of the binary variable causes an influence of one of the dynamic steering rack force and comfort steering rack force to continuously decrease, and an influence of a respective other of the dynamic steering rack force and comfort steering rack force to continuously increase.

4. The method according to claim 2, wherein said deriving the resulting rack force comprises weighting the dynamic steering rack force and the second comfort steering rack force as a function of at least one weighting factor calculated as a function of the control variable, said at least one weighting factor comprising a convex combination of the dynamic steering rack force and the comfort steering rack force.

5. The method according to claim 2, wherein the control variable is derived at least in part as a function of the derived resulting rack force so as to introduce a delay into a derivation of said resulting rack force.

6. The method according to claim 5, wherein an influence of the dynamic steering rack force on the resulting rack force is higher for a resulting rack force that is higher, in absolute terms, than for a resulting rack force that is lower, in absolute terms.

7. The method according to claim 5, wherein the control variable is determined as a function of the vehicle speed.

8. The method according to claim 5, wherein the control variable is ascertained from a characteristic map stored in a memory of the control unit.

9. The method according to claim 8, wherein a characteristic curve of the characteristic map is predetermined as a function of the vehicle speed and/or is selected from a number of predetermined characteristic curves.

10. The method according to claim 8, wherein the control variable is filtered by way of a low-pass filter, preferably after having been ascertained by way of the characteristic map.

11. The method of claim 1, wherein said determining the dynamic steering rack force is based on a sensed torque of a torsion bar within the steering system.

12. The method of claim 1, wherein said determining the dynamic steering rack force is based on a detected torque of a shaft of the electric motor.

13. The method of claim 1, wherein said determining the dynamic steering rack force is based on an ascertained torque of the electric motor.

14. The method of claim 1, wherein said determining the dynamic steering rack force is further based on a rotor angle of the electric motor.

15. The method of claim 1, wherein said variable used for determining the comfort steering rack force is vehicle speed.

16. The method of claim 1, wherein said variable used for determining the comfort steering rack force is a steering angle of a shaft of the electric motor.

17. A steering system for a vehicle comprising an electric motor, a first sensor and a control unit, the control unit having a processor configured to:
    determine a dynamic steering rack force of a steering rack of the vehicle, based on either one of a force or torque that occurs within the steering system;
    determine a comfort steering rack force of a steering rack of the vehicle, based on a variable indicative of a state of movement of the vehicle;
    derive a resulting rack force as a relationship between the dynamic rack force and the comfort rack force;
    determine a target steering torque based on the resultant rack force; and
    send a first signal from the control unit to an electric motor for enacting the target steering torque upon the steering system so as to control said power steering of the vehicle.

18. An open-loop and/or closed-loop control device for a steering system for a vehicle, wherein the open-loop and/or closed-loop control device is configured to:

determine a dynamic steering rack force of a steering rack of the vehicle, based on either one of a force or torque that occurs within the steering system;

determine a comfort steering rack force of a steering rack of the vehicle, based on a variable indicative of a state of movement of the vehicle;

derive a resulting rack force as a relationship between the dynamic rack force and the comfort rack force;

determine a target steering torque based on the resultant rack force; and send a first signal from the control device to an electric motor for enacting the target steering torque upon the steering system so as to control said power steering of the vehicle.

* * * * *